United States Patent [19]
Zuber

[11] Patent Number: 5,836,728
[45] Date of Patent: Nov. 17, 1998

[54] FLOATING REAMER HOLDER

[75] Inventor: Larry L. Zuber, Antwerp, Ohio

[73] Assignee: Dana Corporation, Toledo, Ohio

[21] Appl. No.: 769,223

[22] Filed: Dec. 17, 1996

[51] Int. Cl.$^6$ ..................................................... B23B 31/02
[52] U.S. Cl. ..................... 408/238; 408/186; 408/239 R; 279/16; 279/18
[58] Field of Search .................................. 408/186, 238, 408/239 R, 117; 279/16, 18

[56] References Cited

U.S. PATENT DOCUMENTS

| | | | |
|---|---|---|---|
| 1,241,177 | 9/1917 | Watts . | |
| 1,376,791 | 5/1921 | Baker et al. . | |
| 1,907,447 | 5/1933 | Schiltz | 279/16 |
| 2,733,073 | 1/1956 | Phillips | 279/16 |
| 2,767,564 | 10/1956 | Green | 279/16 |
| 2,778,647 | 1/1957 | Benjamin et al. | 279/16 |
| 2,813,723 | 11/1957 | Marcellus | 279/18 |
| 2,828,132 | 3/1958 | Macfarlane | 279/16 |
| 2,833,544 | 5/1958 | Blades | 279/16 |
| 2,869,881 | 1/1959 | Smith | 279/16 |
| 2,898,118 | 8/1959 | Smith | 279/16 |
| 3,364,798 | 1/1968 | Girardin | 279/16 |
| 3,454,283 | 7/1969 | Benjamin et al. | 279/16 |
| 3,955,897 | 5/1976 | Roman et al. | 408/186 |
| 3,994,614 | 11/1976 | Chetirko . | |
| 4,102,594 | 7/1978 | Kress et al. . | |
| 4,776,734 | 10/1988 | Buettiker et al. . | |

*Primary Examiner*—Daniel W. Howell
*Assistant Examiner*—Adesh Bhargave
*Attorney, Agent, or Firm*—Millen, White, Zelano & Branigan, P.C.

[57] ABSTRACT

A floating reamer holder includes a tool holder coupled to a mounting shank which is receivable in the chuck of the turret of a machine tool. The coupling between the tool holder and shank includes both a fine adjustment which adjusts the float in order to prevent enlargement of the hole being reamed as well, as to reduce chatter and a coarse adjustment, which compensates for misalignment between the turret and axis of the reamer. The coarse adjustment is accomplished by attaching the mounting shank to an adaptor with a pair of threaded bolts, each of which pass through oversized holes through the base of the mounting shank and are threaded into threaded bores in the adaptor. Since the holes are oversized, the mounting shank is radially shiftable with respect to the adaptor to compensate for machine misalignment. Lubricating bores extend completely through the mounting shank and completely through the adaptor so that the float assembly can be lubricated without disassembling the floating reamer holder. In order to retain lubricant within the bore and reamer holder assembly, a grease nipple is threaded into the end of the bore in the mounting shank.

11 Claims, 2 Drawing Sheets

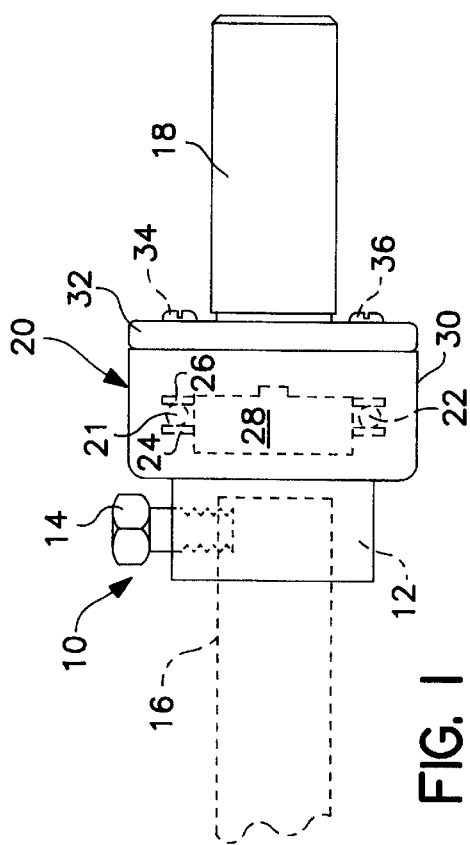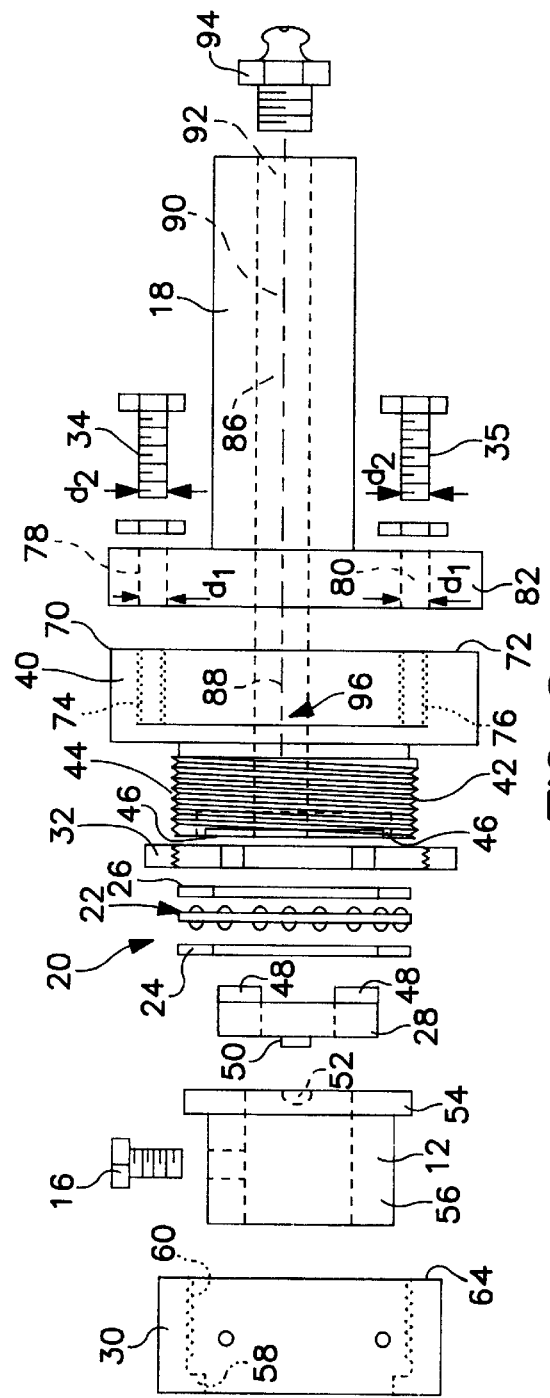

5,836,728

FLOATING REAMER HOLDER

FIELD OF THE INVENTION

The present invention relates to floating reamer holders, and more particularly, the present invention relates to floating reamer holders which are adjustable.

BACKGROUND OF THE INVENTION

Floating holders are used for holding drills, reamers and other cutting tools in screw machines, turret lathes, CNC lathes and CNC turning centers. Generally, these holders include a full floating feature to correct for misalignment which frequently occurs between a cutting tool and work piece. Float is accomplished by mounting the holder so that it floats freely on ball bearings operating between hardened, ground, highly polished balls which provide an automatic radial adjustment to ensure alignment of the cutting tool with a previously drilled hole.

By using floating holders, the occurrence of chatter and of holes which are bell mouthed or egg-shaped are substantially reduced. Currently used floating reamer holders include a spanner nut which is loosened, slightly repositioned and then retightened against a retaining cap in order to finely adjust the reamer holder; however, there are still problems with chatter and alignment not readily correctable by this fine adjustment. Moreover, floating reamer holders must be lubricated to function properly; however, for each lubrication, the holder must be disassembled, which is a time consuming task.

In view of shortcomings of currently available floating reamer holders, there is a need for floating reamer holders which have all of the features of the currently available floating reamer holders also, but include a course adjustment to accommodate machine misalignment.

SUMMARY OF THE INVENTION

It is a feature of the present invention to provide improvements in floating reamer holders which render the reamer holders more readily adjustable to accommodate machine misalignment and easier to lubricate.

In view of this feature and other features, the present invention is directed to a reamer holder having a tool head for mounting a cutting tool which is coupled to a mounting shank by an adaptor. The mounting shank includes holes which receive bolts. By loosening the bolts, the radial position of the shank with respect to the axis of the adaptor is adjustable so as to compensate for misalignment between the cutting tool and a turret driving spindle. This adjustment is in combination with a float adjustment which allows the reamer to follow the hole being cut without making over-sized cuts and which reduces chatter. The float adjustment is made by axially adjusting a threaded connection between the adaptor and a cap, which cap retains the tool holder in abutment with a float assembly.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein:

FIG. 1 is a side view, partially in phantom, of a floating drill and reamer with which the features of the present invention are incorporated;

FIG. 2 is an exploded side view, with portions in phantom, of a floating reamer holder assembly configured in accordance with the principles of the present invention;

DETAILED DESCRIPTION

Figure 3:
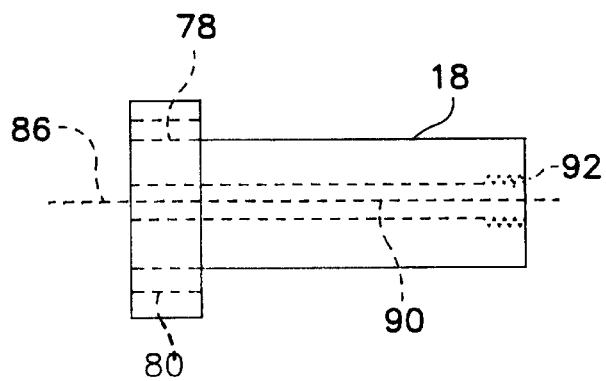
FIG. 3 is a side view of a mounting shank which couples the assemblies of FIGS. 1 and 2 in the chuck of a machine tool.
Figure 4:
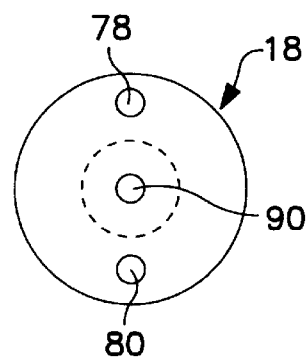
FIG. 4 is an end view of the base of the shank of FIG. 1.
Figure 5:
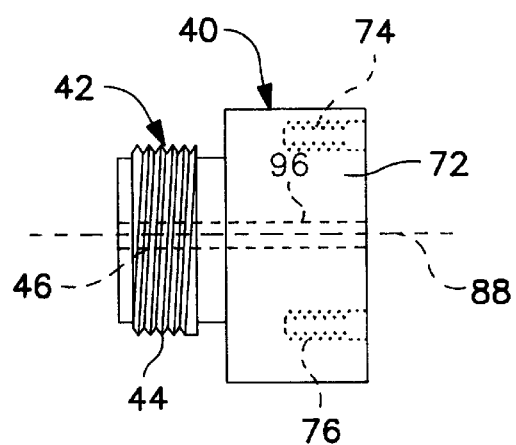
FIG. 5 is a side view of an adaptor upon which the shank of FIGS. 3 and 4 is mounted.

Referring now to FIG. 1, there is shown a floating drill and reamer holder 10 which includes a tool head 12 with a tool lock screw 14 that holds a tool, such as reamer 16, rigidly in place with respect to the tool head. The tool head 12 is coupled to a mounting shank 18 via a float assembly 20. The float assembly 20 comprises a ball bearing assembly 22 disposed between a pair of thrust washers 24 and 26 that cooperate with a coupling 28, all of which are retained within a retaining cap 30. Fine adjustments are accomplished by adjusting a spanner nut 32. In accordance with the present invention, the alignment of the mounting shank 18 with respect to the float assembly 20 or tool holder 12 and tool 16 is accomplished by loosing and retightening a pair of bolts 34 and 36 which, as will be further explained hereinafter, accomplishes a course adjustment.

Figure 6:
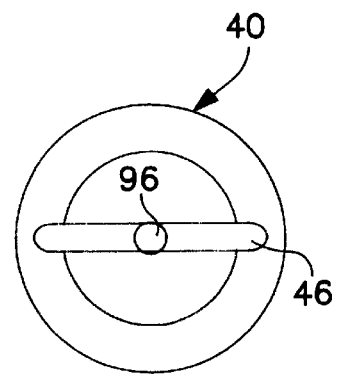
FIG. 6 is a front face view of the adaptor of FIG. 5.

Referring now to FIG. 2, there is shown an exploded view of the floating drill and reamer holder 10 illustrating the improvement, wherein the body which supports the mounting shank 18 includes an adaptor 40 for receiving the threaded bolts 34 and 36. The adaptor 40 has a first threaded end 42 which has threads 44 for threadably mounting the spanner nut 32. The threaded end 42 further includes a transverse slot 46 (also see FIG. 6) for receiving lugs 48 projecting from one axial face 49 of the coupling 28. The coupling 28 has a front lug 50 extending 180° with respect to the lugs 48 and extending from the opposite axial face 51, which lug is received in a groove 52 of the tool holder 12. Consequently, as the body 40 rotates, the coupling 28 drives the tool holder 12, and thus the tool 16, to rotate.

In order to axially retain the tool holder 12 in coupling 28 in engagement with the first end 42 of the adaptor 40, the tool holder 12 has a base flange 54 of a slightly larger diameter than a barrel portion 56 as the tool holder. The base flange 54 is engaged by an internal annular shoulder 58 of the retainer cap 30 when the retainer cap is threaded by threads 60 onto the threaded first end 42 of the adaptor 40. The entire adjustment assembly 20 (see also FIG. 1) is then axially and radially held in place.

Spanner nut 32 has internal threads 62 so as to also be threadably received on the threads 44 of the first end 42 of adaptor 40. The spanner nut 32 then cooperates with the back end face 64 of retainer cap 30 so as to fix the axial position of the retainer cap with respect to adjustment assembly 20.

The float adaptor 40 has a second end 70 comprised of a rear face 72. In the rear face 72 there are a pair of threaded bores 74 and 76 which threadably receive the shanks of bolts 34 and 36. The bolts 34 and 35 are received through smooth bores 78 and 80 in a base plate 82 affixed to the mounting shank 18. The smooth bores 78 and 80 have a diameter $d_1$ which is slightly larger than the diameter $d_2$ of the shanks of the bolts 34 and 35. For example, the diameters $d_2$ of the through holes 78 and 80 have a diameter of ⅜ inch, while the shanks of the bolts 34 and 35 have the diameter of ¼–20 bolts. Accordingly, the axis 86 of the shank 18 may be adjusted radially by a distance of about 0.030 with respect to the axis 88 of the adaptor 40. The adjustment of the axis 86 with respect to the axis 88 is a course, fixed adjustment, which, when combined with the "fine" floating adjustment achieved by adjusting the axial position of the tool holder 12 with respect to the adaptor 40 to adjust the float assembly 20, provides a substantial improvement in alignment of a tool such as the reamer 16.

The mounting shank 18 has a bore 90 which extends completely therethrough. The bore 90 has a threaded end 92 for receiving a grease fitting 94. The adaptor 40 also has a bore, bore 96, which extends all the way therethrough so as to be in communication with the components of the float assembly 20. Accordingly, it is not necessary to disassemble the floating drill and reamer holder 10 for lubrication since all one need do is lubricate directly through the grease fitting 94 which communicates with the adjustment assembly 20 via the bores 90 and 96.

In practice, the floating drill and reamer holders 10 are available in two holder sizes, the larger holder size having a tool mounting bore of 1 inch and the smaller holder size having a tool mounting bore of ⅝ inch. With the larger size, the diameter of the mounting shank 18 is 1 inch and for the smaller size, the diameter of the mounting shank 18 is ¾ inch. By loosening the bolts 34 and 36 in adjustment of up to 0.030 inch in any radial direction may be made to compensate for misalignments between the turret and spindle. After the adjustment is made, the bolts 34 and 35 are then tightened. When combined with the fine float adjustment, which allows the reamer 18 to follow the hole being reamed without making oversized cuts and which helps eliminate chatter, machine misalignment is also compensated for, which compensation eliminates bell mouthed and egg-shaped holes. Moreover, the bores 90 and 96 facilitate rapid and convenient lubrication of the float assembly 20.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An adjustable floating reamer holder comprising:

a tool holder for rigidly holding a reamer;

a mounting shank for mounting the tool holder in the turret of a machine tool drive for rotating the tool holder and, thus, the tool; the mounting shank including a base flange fixed with respect to the mounting shank;

an adaptor to which the base of the mounting shank is adjustably fixed by an adjustable coupling, the adaptor including a threaded protrusion;

a float assembly axially disposed with respect to the threaded protrusion between the tool holder and adaptor;

a coupling for coupling the adaptor to the tool holder; and a cap for axially holding the tool holder in engagement with the coupling and float assembly, the cap having threads thereon for threading with the threaded projecting end of the adaptor, whereby fine floating adjustments are made by adjusting the axial position of the cap with respect to the adaptor and alignment adjustment is accomplished by adjusting the mounting shank radially with respect to the adaptor.

2. The adjustable floating reamer holder of claim 1, wherein the adjustable coupling between the mounting shank and adaptor comprises openings through the adaptor which are aligned with threaded bores in the adaptor that receive threaded bolts passing through the openings in the mounting shank and threading with the threaded bores in the adaptor.

3. The adjustable floating reamer holder of claim 2, wherein the holes in the mounting shank are holes through the base flange of the mounting shank.

4. The adjustable floating reamer holder of claim 3, wherein the holes in the mounting shank are circular holes with smooth walls which are larger than the diameter of the threaded portions of the bolts.

5. The adjustable floating reamer holder of claim 4, wherein the holes provide a radial adjustment of up to 0.030 inch.

6. The adjustable floating reamer holder of claim 5, further including a bore completely through the shank and a bore completely through the adaptor which is aligned with the bore through the shank, wherein lubricant is introduced through the bore to lubricate the adjustment assembly without disassembling the cap from the threaded projection.

7. The adjustable floating reamer holder of claim 6, wherein the bore through the mounting shank has an end distal from the base of the mounting shank and further includes a grease fitting disposed in that end.

8. The adjustable floating reamer holder of claim 1, further including a bore completely through the shank and a bore completely through the adaptor which is aligned with the bore through the shank, wherein lubricant is introduced through the bore to lubricate the adjustment assembly without disassembling the cap from the threaded projection.

9. The adjustable floating reamer holder of claim 1, wherein the bore through the mounting shank has an end distal from the base of the mounting shank and further includes a grease fitting disposed in that end.

10. The adjustable floating reamer holder of claim 1, wherein the coupling includes projecting lugs on opposite axial faces thereof which are received in slots in the threaded protrusion of the adaptor and in the tool holder.

11. The adjustable floating reamer holder of claim 10, wherein the lugs on opposite faces of the coupling are disposed to radially extend at 180° to one another.

* * * * *